(12) United States Patent
Galletti

(10) Patent No.: US 6,971,595 B2
(45) Date of Patent: Dec. 6, 2005

(54) SELF-FED SHREDDER DEVICE FOR SHAVINGS-REMOVING MACHINE TOOLS

(75) Inventor: Alfonso Galletti, Turin (IT)

(73) Assignee: GI.PI. S.r.l., Turin (IT)

( * ) Notice: Subject to any disclaimer, the term of this patent is extended or adjusted under 35 U.S.C. 154(b) by 130 days.

(21) Appl. No.: 10/763,262

(22) Filed: Jan. 26, 2004

(65) Prior Publication Data

US 2005/0023391 A1    Feb. 3, 2005

(30) Foreign Application Priority Data

Jul. 31, 2003 (IT) .......................... TO2003A0591

(51) Int. Cl.[7] .......................... B02C 17/16; B02C 23/02
(52) U.S. Cl. ........................................... 241/82.1
(58) Field of Search .............. 241/82.1, 82.5, 241/82.6, 82.7, 74

(56) References Cited

U.S. PATENT DOCUMENTS

| 3,659,638 A | * | 5/1972 | Paoli ........................ 241/74 |
| 6,149,083 A | * | 11/2000 | McFarland ................ 241/82.5 |
| 6,655,615 B1 | * | 12/2003 | Hartmann ................. 241/89.3 |

FOREIGN PATENT DOCUMENTS

| EP | 1 151 822 A2 | 11/2001 |
| GB | 2 056 399 A | 3/1981 |
| JP | 10 269 387 | 4/2000 |

* cited by examiner

Primary Examiner—Derris H. Banks
Assistant Examiner—Faye Francis
(74) Attorney, Agent, or Firm—Sughrue Mion, PLLC

(57) ABSTRACT

A self-fed shredder device for shavings-removing machine tools, including a channel element (3) in which extends a motorized auger conveyor (4) whose terminal end (7) traverses an internally grooved cylindrical body (14) and bears a lobed rotor (22) axially facing the exterior of the grooved cylindrical body (14). The lobed rotor (20) is able to rotate within a laterally open generally tubular body (20).

5 Claims, 3 Drawing Sheets

SELF-FED SHREDDER DEVICE FOR SHAVINGS-REMOVING MACHINE TOOLS

FIELD OF THE INVENTION

The present invention relates to a self-fed shredder device for shavings-removing machine tools, adapted to reduce the length of the shavings produced by the machine tools and allow the shavings to be transported hydraulically or pneumatically.

STATE OF THE PRIOR ART

More in particular, the invention relates to a self-fed shredder device of the type described and illustrated in the European patent application EP-1151822 by the same Applicant, comprising a conveyor with a channel element for feeding the shavings, along which extends a motorised auger conveyor having an initial end driven in rotation by a motor and a terminal end which constitutes the advancing organ of a trituration assembly. Said trituration assembly includes an internally grooved cylindrical body positioned coaxially to the end terminal of the auger conveyor, and a lobed rotor axially facing the exterior of the grooved cylindrical body and driven in rotation by the auger conveyor.

In said shredder device, the combined effect of the rotation of the auger and of the presence of the inner grooves of the cylindrical body of the trituration assembly achieves an effective action of skeining, straightening and distending the elongated metallic shavings while they are self-fed towards the rotor. The interaction between the lobes of the rotor and the end of the grooved cylindrical body which faces it achieves an action of triturating and grinding the shavings, reducing their dimensions in length to such values that they can be evacuated pneumatically, or hydraulically, together with any lubricating and/or refrigerating liquids.

SUMMARY OF THE INVENTION

The present invention constitutes an enhancement of the one according to the aforesaid document EP-1151822, and its object is further to improve the operating effectiveness and the functionality of the self-fed shredder device.

According to the invention, said object is achieved mainly thanks to the fact that the lobed rotor is positioned within a generally tubular body open laterally around the lobed rotor.

According to this solution idea, the discharge of the shavings from the shredder assembly is considerably improved and increased relative to the case of the shredder device known from the aforementioned document EP-1151822: whilst in the latter the tubular body within which the lobed rotor is capable of rotating has a lateral wall which encloses for the most part said lobed rotor, according to the invention the periphery of the lobed rotor is circumferentially almost completely free, which assures a better and more complete outflow of the triturated shavings, avoiding risks of jamming.

According to another aspect of the invention, the initial end of the auger conveyor is connected to the motor by means of a rapid axial coupling assembly. This characteristic also improves the functionality of the shredder device, because it makes it far easier and more rapid to conduct the operations of maintaining and possibly replacing the auger conveyor due to wear, with appreciable reductions in the inoperative idle times of the device.

BRIEF DESCRIPTION OF THE DRAWINGS

The invention shall now be described in detail with reference to the accompanying drawings, provided purely by way of non limiting example, in which.

DETAILED DESCRIPTION OF THE INVENTION

Figure 1:
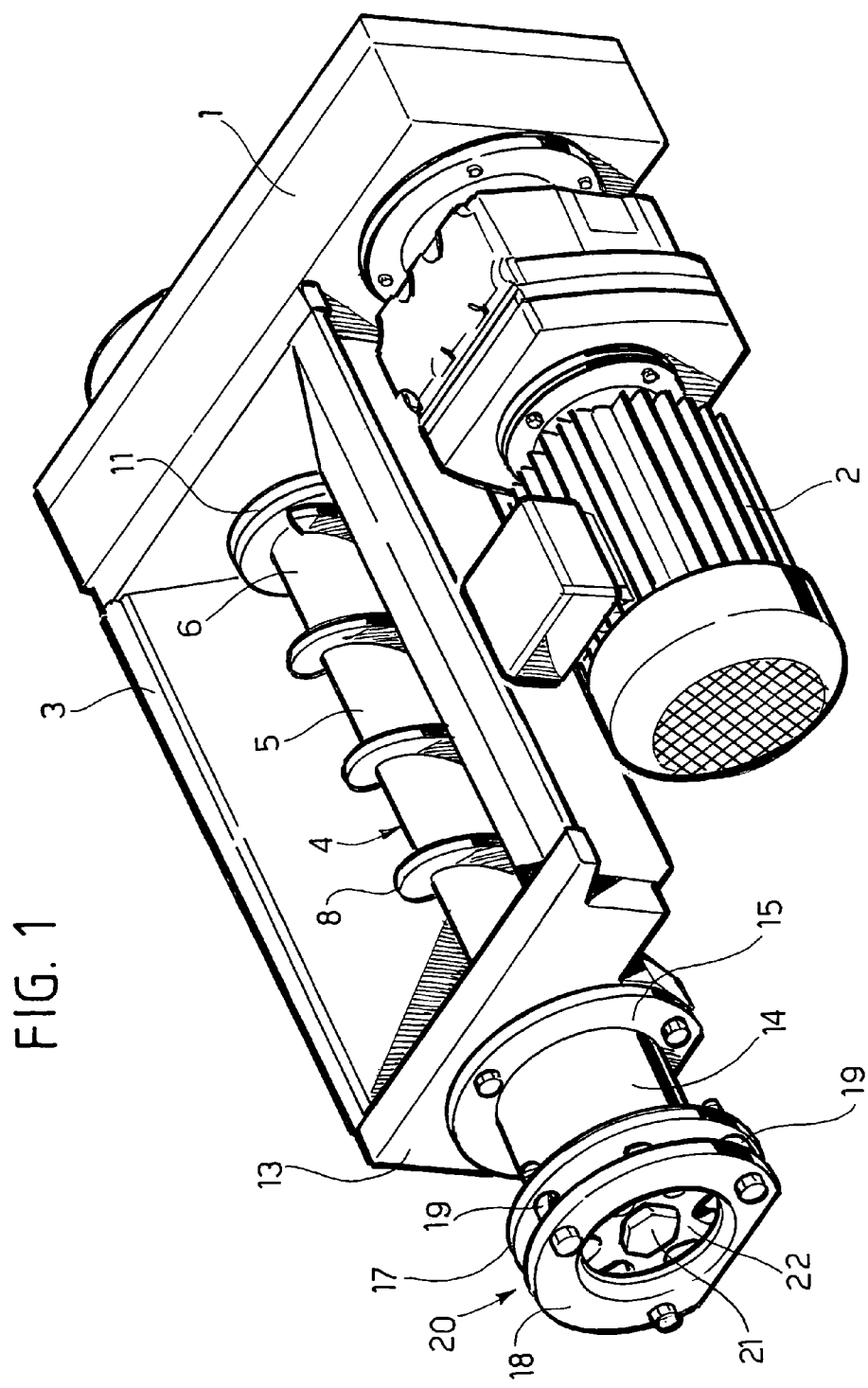
FIG. 1 is a schematic perspective view of a self-fed shredder device according to the invention.
Figure 2:
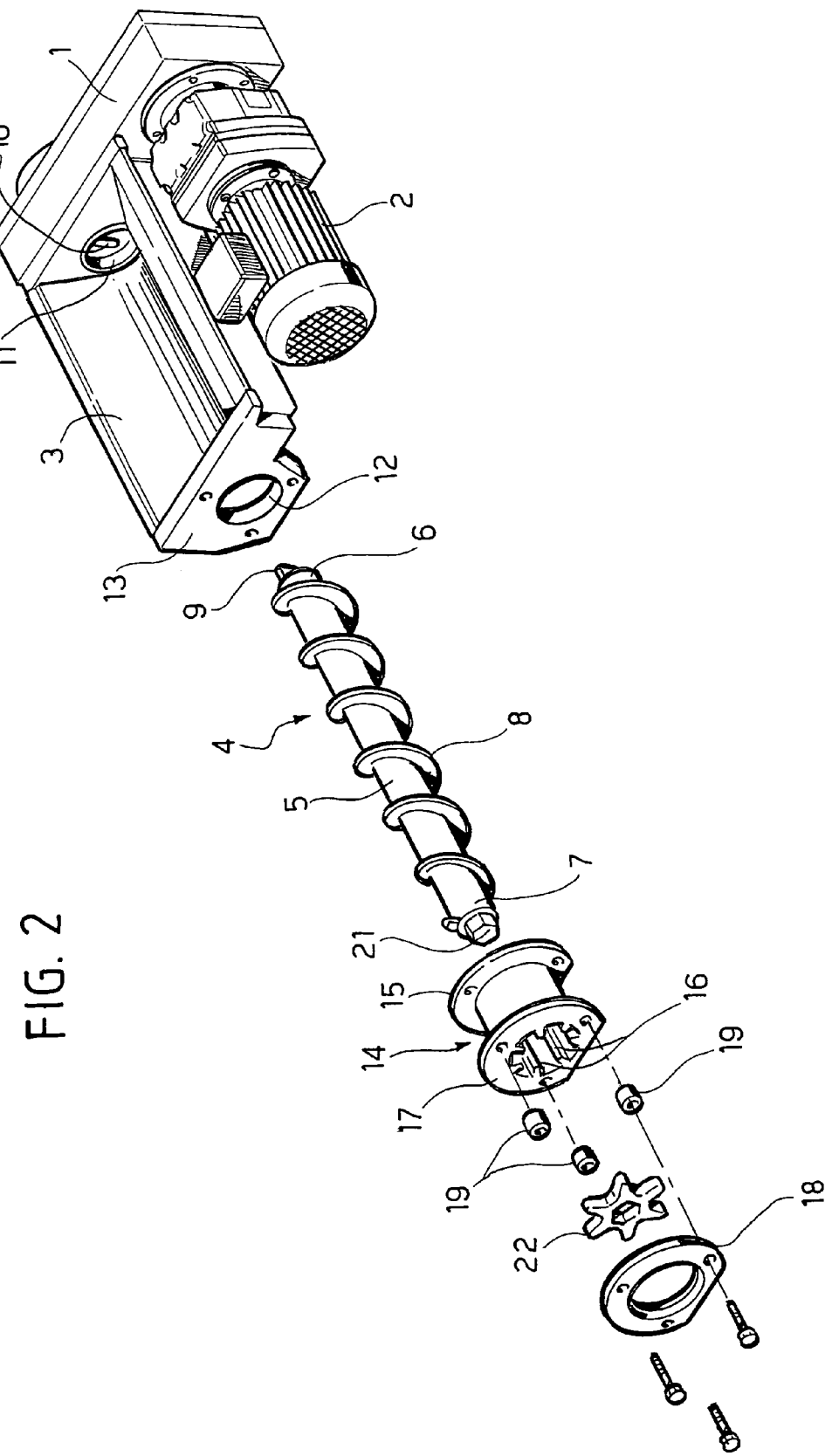
FIG. 2 is a partially exploded, reduced scale view of FIG. 1.
Figure 3:
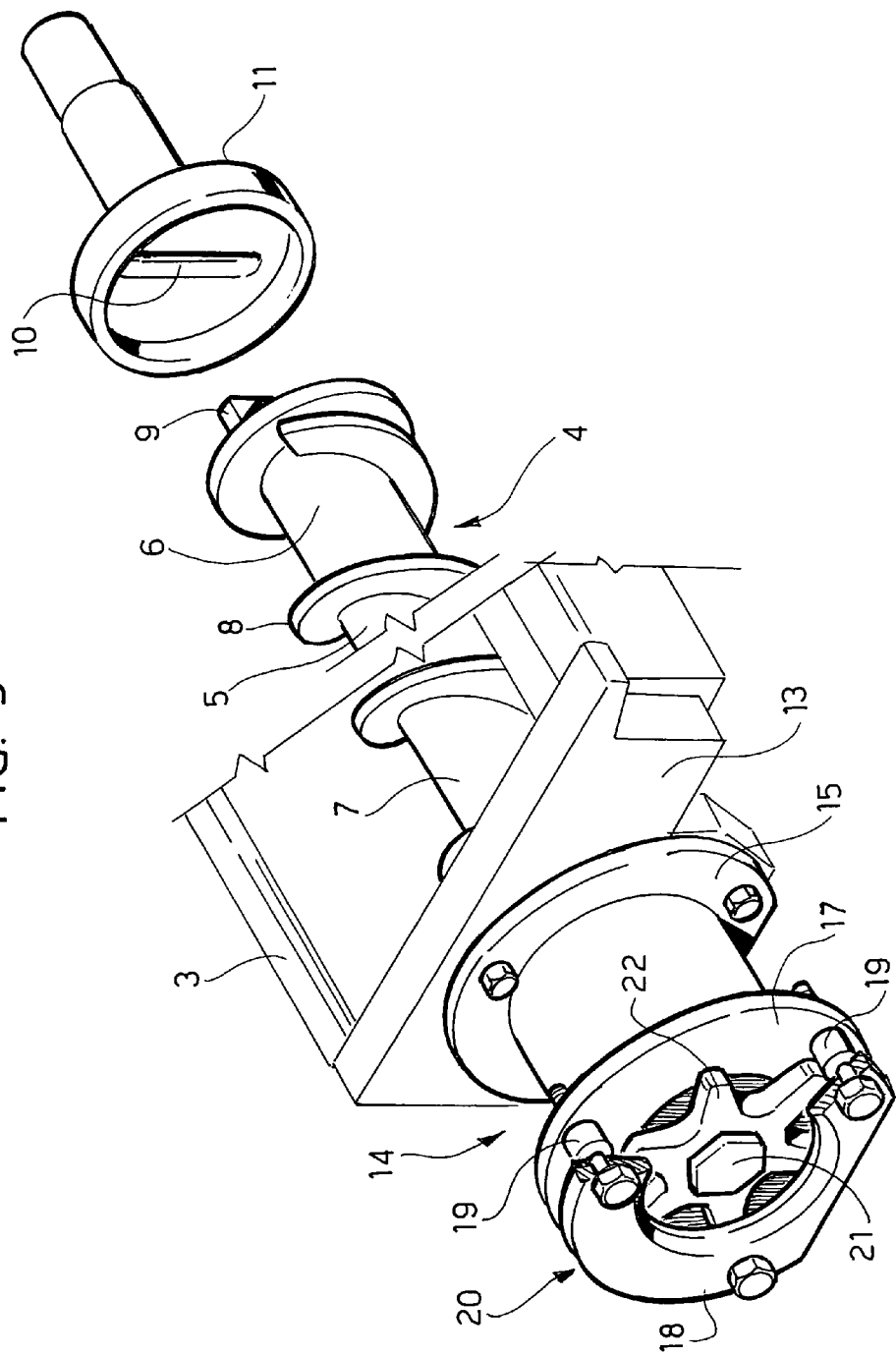
FIG. 3 is a partial view, partially exploded and partially broken view of FIG. 1.

With reference to the drawings, the self-fed shredder device according to the invention comprises a support structure generically designated by the reference number 1, which is adapted for its application in correspondence with the exit of the shavings with any lubricating and/or refrigerating liquids of one or of a group of shavings-removing machine tools.

The support structure 1 bears on a side an electric motor 2 and on the opposite side a horizontal channel element 3 set side by side to the motor 2 and whose bottom is formed with a series of slits, not shown in the drawings. Along the channel element 3 extends an auger conveyor globally designated as 4 and constituted by a shaft 5 having an initial end 6 and a terminal end 7 between which is positioned a propeller 8.

The initial end 6 is formed with a radial key frontal projection 9 which axially engages inside a complementary frontal recess 10 of a rotary support 11 borne by the support structure 1 and driven to rotate by the motor 2 by means of a conventional transmission, not shown in the drawings, for instance a chain, belt, or gear transmission. The key projection 9 and the recess 10 constitute a rapid axial coupling assembly for the auger conveyor which appreciably facilitates its assembling and disassembling operation for the maintenance of the device.

The output end 7 of the shaft 5 of the auger conveyor 4 projects outside the channel element 3 through an opening 12 of an end wall 13 of said channel element 3 and extends coaxially through a sleeve like cylindrical body 14 fastened at one end, by means of an annular flange 15, to the wall 13. The sleeve like body 14 is internally formed with a circumferential series of grooves 16, directed axially or also with an angle relative to its axis, and at the other end it has another annular flange 17. An additional flange or annular bottom 18 is fastened coaxially to the flange 17 at a certain distance therefrom, by means of a series (in the illustrated example, in the number of three angularly equidistant) spacers 19. The flanges 17 and 18 with the spacers 19 in practice define a generally tubular body 20 with open lateral wall. The lower part of said tubular body 20, in the case of the illustrated example, has planar surface.

The terminal end 7 of the shaft 4 of the auger conveyor 5 coaxially traverses the grooved sleeve 14 and projects beyond it with a prismatic axial tang 21 whereon is keyed a lobed rotor 22. Said rotor 22, which thus axially faces the grooved sleeve 14, can have a number of lobes between 2 and n, which arranged so they radially face the open space circumferentially limited between the flanges 17, 18.

In operation, the shavings with any lubricating and/or refrigerating liquid coming from the machine tools are discharged into the channel element 3, whilst the auger conveyor 4 is maintained in rotation by the motor 2. The small shavings and any lubricating and/or refrigerating fluid exit by gravity from the bottom slits of the channel element 3 towards a collecting tank for hydraulic or pneumatic transport to a filtration system.

The shavings with greater length or massed together are transferred by the auger conveyor 4 in the direction of the terminal end 7 thereof. The shavings are then thrust through the grooved sleeve 14 and there they are subjected to an unbundling and distending effect, whilst they are simultaneously made to advance in the direction of the rotor 22. The shavings are then subjected to a trituration and chipping action by effect of the interaction between the edges of the lobes of the rotor 22 and the end of the grooved sleeve 14 which faces it. Following said trituration action, the shavings completely exit the device both axially, through the annular flange 18, and radially through the lateral circumferential space between the annular flanges 17 and 18, reaching the tank wherefrom they will be transferred hydraulically or pneumatically towards the filtration system.

As described in the aforementioned document EP-1151822 the device is also provided with a counter-rotation system, adapted to operate automatically a rotation of the auger conveyor 4 in the opposite direction to that of the transport of the shavings for a short time interval, thereby eliminating negative effects due to massing and jamming of the shavings.

Naturally, the construction details and the embodiments may be varied widely relative to what has been described and illustrated herein, without thereby departing the scope of the present invention as defined in the claims that follow.

What is claimed is:

1. A self-fed shredder device for shavings-removing machine tools, comprising a conveyor with a channel element for feeding the shavings, a motor, and an auger conveyor extending along said channel and having an initial end driven in rotation by said motor and a terminal end which constitutes an advancing organ of a shredder assembly including an internally grooved cylindrical sleeve positioned coaxially to said terminal end of said auger conveyor, and a lobed rotor axially facing the exterior of said grooved cylindrical sleeve and driven in rotation by said auger conveyor, wherein said lobed rotor is positioned within a generally tubular body and wherein said tubular body is laterally open around said lobed rotor.

2. A device as claimed in claim 1, wherein said tubular body is formed by a first annular flange borne coaxially by said grooved cylindrical sleeve a second annular flange distanced from said first annular flange and fastened thereto, and axial spacers interposed between said flanges.

3. A device as claimed in claim 1, wherein said initial end of said auger conveyor is connected to said motor by means of a rapid axial coupling assembly.

4. A device as claimed in claim 3, wherein said rapid axial coupling assembly comprises a frontal radial key projection of said initial end of the auger conveyor and a swivelling support actuated by said motor and formed with a frontal recess complementary to said key projection.

5. A device as claimed in claim 1, wherein said motor is set laterally side by side to said auger conveyor.

* * * * *